United States Patent [19]
Unterborn et al.

[11] 3,825,243
[45] July 23, 1974

[54] MECHANICALLY ACTUATED HYDRAULIC VEHICLE LEVELING SYSTEM

[75] Inventors: Ralph D. Unterborn, Dayton; Roy C. Bodem; Joseph W. Wanner, both of Kettering, all of Ohio

[73] Assignee: General Motors Corporation, Detroit, Mich.

[22] Filed: Nov. 30, 1972

[21] Appl. No.: 310,678

[52] U.S. Cl............................................. 267/65 D
[51] Int. Cl............................................... F16f 5/00
[58] Field of Search...................... 267/65 R, 65 D

[56] References Cited
UNITED STATES PATENTS

| | | | |
|---|---|---|---|
| 3,433,474 | 3/1969 | Piret................................. | 267/65 R |
| 3,690,688 | 9/1972 | Fleury............................... | 267/65 D |

*Primary Examiner*—James B. Marbert
*Attorney, Agent, or Firm*—Charles R. Engle

[57] ABSTRACT

A vehicle hydraulic leveling system utilizing pressurized fluid supplied by an automatic transmission pump having a sump, the fluid being automatically supplied to leveling devices maintaining a normal constant height between sprung and unsprung masses. The fluid pressurized by the transmission pump is first supplied to a brake booster assembly and then is applied to a flow divider assembly which regulates flow between the leveling system and a power steering fluid circuit. If the vehicle height is normal or above normal, flow to the leveling system is blocked, the flow divider being biased directing 100 percent of the flow to the power steering system. If the height is below normal, the leveling system is automatically connected in fluid communication with the flow divider which directs approximately 10 percent of the flow to the leveling system. The pressurized fluid in the leveling system raises the leveling devices until the normal height is reached whereupon a control valve responsive to the height, moves blocking flow to the leveling devices. When the vehicle height is above normal, the control valve is mechanically moved mechanically actuating an exhaust valve discharging pressurized fluid from the leveling devices to the pump sump until the normal height is re-established.

3 Claims, 3 Drawing Figures

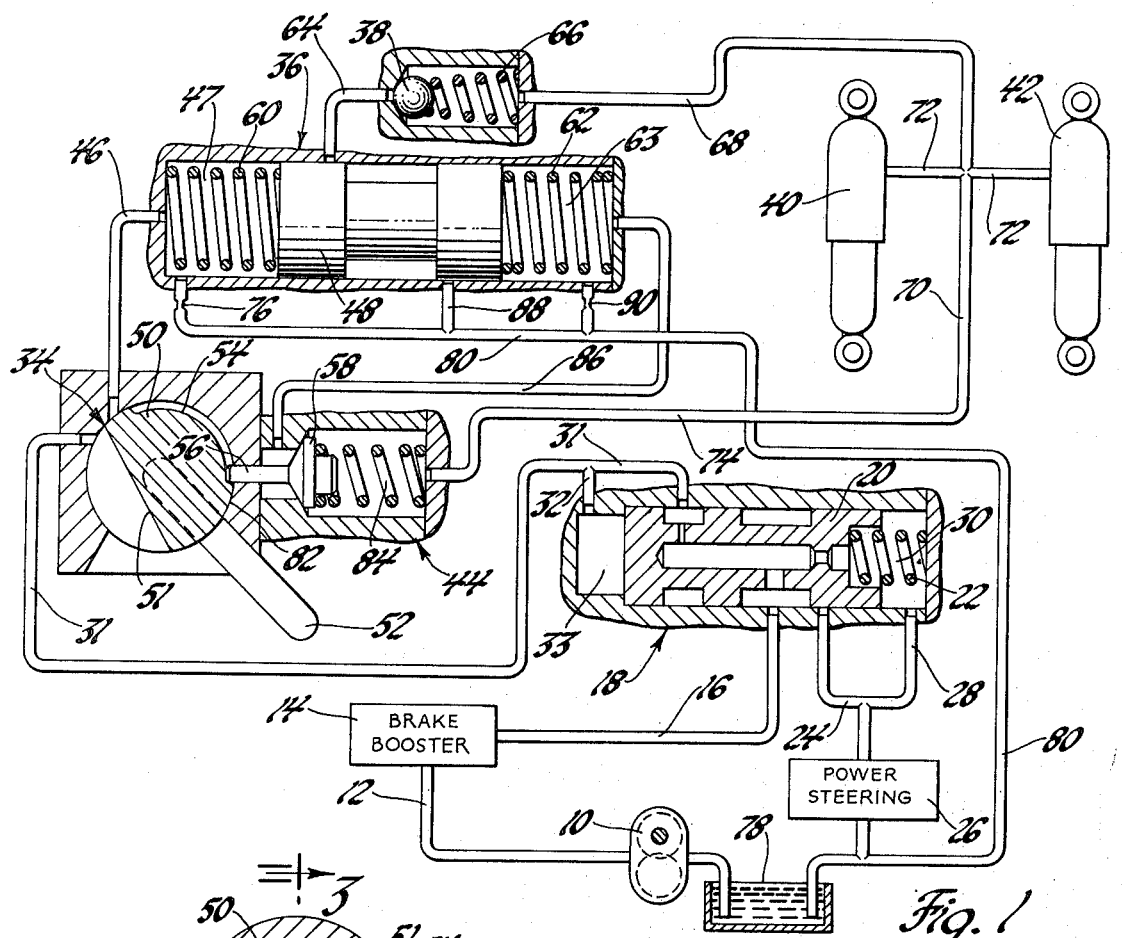
Fig. 1
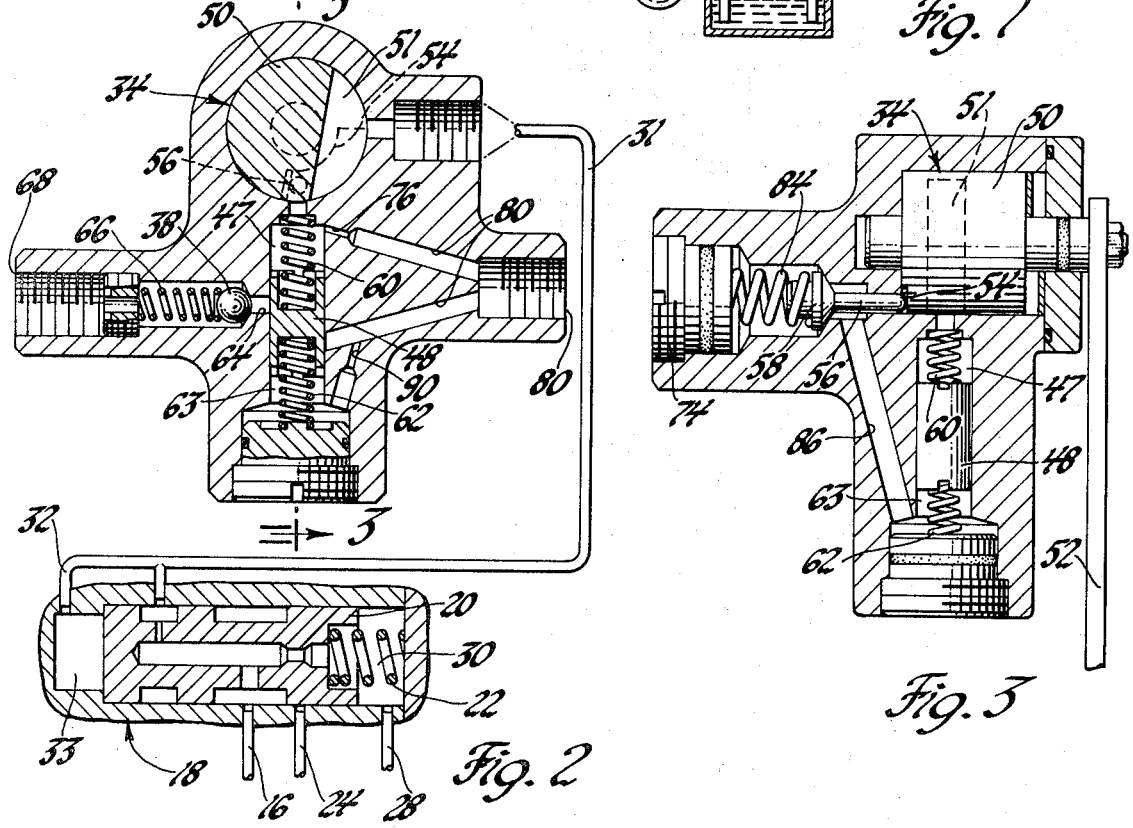
Fig. 2
Fig. 3

MECHANICALLY ACTUATED HYDRAULIC VEHICLE LEVELING SYSTEM

This invention relates to a system for automatically raising and lowering vehicle load leveling devices in response to vehicle loads. More specifically, our invention concerns an automatic vehicle leveling system which mechanically automatically decreases the height between the sprung and unsprung masses of a vehicle after the ignition is shut off and the vehicle load is removed.

Automatic vehicle load leveling systems generally include an electrically operated pump or a pump responsive to a rotating part of the vehicle to supply pressurized fluid to the load leveling system while the vehicle is in operation. Also these systems usually include an electrically operated valve or means requiring energization of the ignition circuit for opening an exhaust passage and discharging pressurized fluid from load leveling devices to a fluid sump while lowering the vehicle height as its load is removed. Such systems necessarily require that the ignition switch be closed completing a circuit to the electrically actuated valve before the vehicle height can be lowered. Accordingly, a prime purpose of this invention is to provide an automatic mechanically actuated means for lowering vehicle height after the ignition circuit is opened, any existing load is removed and the operator has departed. A further purpose of this invention is to provide a relatively simple and economically constructed hydraulic vehicle leveling system capable of automatically maintaining a desired vehicle height regardless of load, the system utilizing pressurized fluid from a transmission pump. Specifically, the pressurized fluid discharged from the transmission pump is first used to pressurize a brake booster mechanism and then is supplied to a flow divider which supplies 100 percent of the pressurized fluid to a power steering system when vehicle load leveling is not required. The flow divider supplies 10 percent of the fluid to the load leveling system when the height of the vehicle is below a desired normal.

Our mechanically actuated hydraulic vehicle leveling system includes a rotatable valve actuated by a link attached to the sprung mass of the vehicle so that the rotatable valve is positioned in accordance with vehicle height. Should the vehicle height decrease below normal, the rotatable valve moves connecting a shuttle valve with the pressurized fluid supplied from the flow divider. The pressurized fluid moves the shuttle valve against a biasing spring so that it is connected in fluid circuit with the load leveling devices, raising the vehicle until the normal height is again established. The rotatable valve includes a cam portion engaging a pin connected to an exhaust valve. Rotation of the exhaust valve in response to a vehicle height above normal cams the exhaust valve open removing pressurized fluid from the load leveling devices through the shuttle valve to the transmission pump sump.

Accordingly, a primary object of this invention is the provision of an improved mechanically actuated hydraulic vehicle leveling system capable of automatically decreasing the vehicle height upon removal of a load therefrom.

Another object of this invention is the provision of an automatic mechanically actuated hydraulic vehicle leveling system including a mechanically actuated valve movable in response to a decrease in vehicle load so that the normal height of the vehicle is established after operation of the vehicle has been discontinued.

A further object of the subject invention is the provision of a mechanically actuated rotary valve in a vehicle hydraulic leveling system, the valve being rotated in response to vehicle height mechanically actuating an exhaust valve establishing a normal height after the vehicle ignition circuit is open and the vehicle is unloaded.

The novel features which we believe to be characteristic of our invention are set forth with particularity in the appended claims. Our invention itself, however, both as to its organization and method of operation, may be best understood by reference to the following description taken in connection with the accompanying drawings in which:

FIG. 1 is a schematic diagram illustrating a vehicle hydraulic system incorporating our invention.

FIG. 2 is a partial schematic diagram illustrating a flow divider and the rotary supply valve of our invention in cross section.

FIG. 3 is a cross sectional view taken on line 3—3 of FIG. 2 further illustrating the rotary contol of our invention.

Referring now to FIG. 1 a vehicle hydraulic system is schematically shown as including a transmission pump 10 discharging fluid through a conduit 12 to a brake booster 14. The brake booster 14 is of the open center type passing fluid therethrough to conduit 16 supplying pressurized fluid to a flow divider assembly 18. The flow divider 18 is of the usual type including a spool valve 20 biased to a normal position by a spring 22 such that 100 percent of the fluid discharged by pump 10 is transmitted through conduit 24 to a vehicle power steering circuit 26, diagrammatically illustrated in the schematic fluid circuit. A branch conduit 28 connects with cavity 30 containing the spring 22 so that pressurized fluid normally assists the spring in biasing the spool valve to the left as illustrated.

A conduit 31 is connected with the flow divider assembly 18 and also with a rotary control valve assembly 34. A branch conduit 32 connects the conduit 31 with a fluid chamber 33 allowing the fluid to move spool valve 20 against spring 22 while the rotary valve assembly 34 is closed. During these conditions all of the fluid flows through spool valve 20 to the power steering circuit 26.

The vehicle hydraulic leveling system includes a pressure responsive shuttle valve assembly 36, a check valve 38, vehicle leveling devices 40 and 42 and an exhaust valve assembly 44. A conduit 46 connects the rotary control valve assembly 34 with one end of the pressure responsive valve assembly 36 supplying pressurized fluid to a chamber 47 against one end of a shuttle valve 48 when the rotary control valve assembly is actuated to connect conduit 31 with conduit 46.

The rotary control valve assembly 34 includes a rotary valve member 50 rotatable in response to the prevailing height between the vehicle sprung and unsprung masses by virtue of a link 52 being connected to automatically move the valve as this height changes. In a normal position, that is, when the vehicle is at a desired height, the link 52 positions valve 50 to block flow between conduits 31 and 46 as shown in FIG. 1. The rotary valve 50 includes a notch 51 on one side and a recessed cam slot 54 on an opposite side, the cam slot slidably receiving a cam rod 56 connected with an exhaust valve 58 in the exhaust valve assembly 44 for a purpose later to be described.

The shuttle valve member 48 is slidably received within the pressure responsive valve assembly 36 and is biased to a neutral position by springs 60 and 62 applying pressure against the respective ends of the valve member. The spring 60 is placed in fluid chamber 47 while spring 62 is placed in fluid chamber 63 within the valve assembly 36. A conduit 64 connects the one-way check valve assembly 38, which is normally biased closed by a spring 66, with the valve assembly 36. A conduit 68 connects the check valve assembly 38 with the load leveling devices 40 and 42 via conduits 70 and 72. The conduit 70 is in open fluid communication with a conduit 74 connecting with the exhaust valve assembly 44, which in turn connects with sump 78 via exhaust conduit 80. The fluid chambers 47 and 63 are respectively in fluid communication with exhaust conduit 80 through flow restricting orifices 76 and 90. These orifices prevent the occurrence of excessive pressures in the fluid chambers 47 and 63.

In operation, our mechanically actuated automatic hydraulic vehicle leveling system receives pressurized fluid discharged by the transmission pump 10 through the open center brake booster assembly 14 as regulated by the flow divider assembly 18. When the vehicle is at a desired normal height, the flow divider valve 20 is positioned to direct 100 percent of the pressurized fluid through conduit 24 to the power steering system diagrammatically illustrated at 26. When the vehicle height decreases below a desired height due to, for example, an increased load, the variation in height between the vehicle sprung and unsprung masses rotates the link 52 actuating rotary valve 50 connecting conduits 31 and 46 supplying pressurized fluid against the left end of shuttle valve 48 in the pressure responsive valve assembly 36. This is accomplished by properly positioning a slotted portion 51 of the rotary valve 50 providing for flow from conduit 31 to conduit 46. The pressurized fluid against the left end of valve 48 moves it against the force of spring 62 supplying pressurized fluid through conduit 64, which is effective to unseat check valve 38, to the load leveling devices 40 and 42 through conduits 68 and 72. The load leveling devices 40 and 42 are expanded until the normal desired vehicle height again is obtained and link 52 is actuated rotating valve 50 blocking flow to conduit 46 from the supply conduit 31. Should an excessive quantity of fluid be applied against valve 48 in valve chamber 47 an orificed restriction 76 regulates a bleed off flow through exhaust conduit 80 back to sump 78.

Upon removal of a load from the vehicle, the consequent increase in height between the sprung and unsprung masses above the desired normal actuates link 52 rotating valve 50 so that cam rod 56 of exhaust valve 58 is caused to ride upon land surface 82 of the valve 50 thereby opening exhaust valve 58 against the force of biasing spring 84. The opening of exhaust valve 58 connects conduit 74 with a conduit 86 supplying pressurized fluid from the load leveling devices 40 and 42 to valve chamber 63 at the right end of shuttle valve 48. This pressure fluid is effective to move the shuttle valve to the left connecting valve chamber 63 with a conduit 88 which in turn connects with conduit 80 in communication with the pump sump 78. An orificed restriction 90 connects with fluid chamber 63 and conduit 80 and likewise regulates the bleed off of pressurized fluid in chamber 63 should an excessive pressure develop therein. In this manner pressurized fluid is exhausted from the leveling devices 40 and 42 back to the sump 78 until the link 52 again is moved to a normal vehicle height position whereby the cam rod 56 again enters the recessed area 54 and the rotary valve 50 blocks flow therethrough.

It is apparent from the above description that our invention requires energization of the ignition circuit and operation of the vehicle to energize the transmission pump 10 and supply pressurized fluid to the various vehicle components including our automatic leveling system. It is significant in our leveling system, however, that the rotary valve 50 is mechanically actuated by virtue of the link 52 being responsive to changes in height between the vehicle sprung and unsprung masses. In particular, it is significant that upon discontinuance of use of the vehicle and upon the consequent opening of the ignition circuit and deenergization of the transmission pump, our system is still effective to decrease the vehicle height to a desired normal after the occupants have vacated and removed any load present in the vehicle. This feature is accomplished by the link 52 being moved to place cam rod 56 upon land 82 of rotary valve 50 thereby opening the exhaust valve 58 and discharging pressurized fluid through the pressure responsive valve assembly 36 to the pump sump 78 until a normal height is again restored. At this normal height position, the link 52 moves the rotary valve 50 to a position both closing exhaust valve 58 and blocking the flow of pressurized fluid through conduits 31 and 46 to the pressure responsive valve assembly 36.

While we have shown and described a particular embodiment of our invention it will, of course, be understood that various modifications and alternative constructions thereof may be made without departing from the true spirit and scope of our invention and that we intend by the appended claims to cover all such modifications and alternative constructions as fall within the true spirit and scope of our invention.

We claim:

1. In an automatic vehicle leveling system of the type including an automatic transmission pump also supplying pressurized fluid to a brake booster assembly, a flow divider, the leveling system and a power steering system, the flow divider dividing flow between the power steering system and the leveling system as required; the vehicle leveling system comprising: a rotary control valve having a notch on one side and a cam slot on an opposite side; a shuttle valve having fluid chambers at opposite ends thereof; a spring in each chamber biasing said shuttle valve to a neutral position; a fluid passage connecting said flow divider with a fluid chamber at one end of said shuttle valve; said control valve connected in said passage regulating flow from said flow divider to said shuttle valve, at least a pair of leveling devices connected between the vehicle sprung and unsprung masses for maintaining a normal vehicle height; a fluid passage connecting said shuttle valve with said leveling devices; a one-way check valve in said passage between said shuttle valve and said leveling devices permitting flow only toward said leveling devices; a fluid sump supplying fluid to said transmission pump; an exhaust passage connecting said leveling devices with said sump; an exhaust valve in said exhaust passage; said exhaust passage connecting with a fluid chamber at the other end of said shuttle valve; said exhaust valve normally being biased closed when the vehicle height is normal preventing flow from said leveling devices through said shuttle valve to the sump; a cam rod connected to said exhaust valve and having a free end slidably received in said control valve cam slot; and means connecting said control valve with the vehicle sprung mass whereby said valve is rotated as the vehicle height changes, the valve being rotated positioning said notch permitting flow of fluid to said leveling devices when the height is below normal while moving said notch blocking flow when the height is normal, when the height is above normal said valve likewise being rotated blocking flow while also moving said cam rod out of said cam slot thereby opening said exhaust valve connecting said leveling devices with said sump until the normal height is re-established.

2. In a vehicle leveling system of the type described in claim 1 further comprising: fluid passages connecting each of said fluid chambers at the opposite ends of said shuttle valve directly with said sump and an orifice in each of said passages regulating flow of fluid to the sump thereby maintaining a desired fluid pressure in said chambers.

3. In an automatic vehicle leveling system of the type including an automatic transmission pump also supplying pressurized fluid to a brake booster assembly, a flow divider, the leveling system and a power steering system, the flow divider dividing flow between the power steering system and the leveling system as required; the vehicle leveling system comprising: a control valve; a shuttle valve having fluid chambers at opposite ends thereof; a fluid passage connecting said flow divider with a fluid chamber at one end of said shuttle valve; said control valve connected in said passage regulating flow from said flow divider to said shuttle valve, at least a pair of leveling devices connected between the vehicle sprung and unsprung masses for maintaining a normal vehicle height; a fluid passage connecting said shuttle valve with said leveling devices; a one-way check valve in said passage between said shuttle valve and said leveling devices permitting flow only toward said leveling devices; a fluid sump supplying fluid to said transmission pump; an exhaust passage connecting said leveling devices with said sump; an exhaust valve in said exhaust passage; said exhaust passage connecting with a fluid chamber at the other end of said shuttle valve; said exhaust valve normally being biased closed when the vehicle height is normal preventing flow from said leveling devices through said shuttle valve to the sump; means connecting said exhaust valve with said control valve; and means connecting said control valve with the vehicle sprung mass whereby said valve is actuated as the vehicle height changes, the valve permitting flow of fluid to said leveling devices when the height is below normal while blocking flow when the height is normal, when the height is above normal said valve likewise blocking flow while also actuating and opening said exhaust valve connecting said leveling devices with said sump until the normal height is re-established.

* * * * *